(12) United States Patent
Dai et al.

(10) Patent No.: US 9,919,486 B2
(45) Date of Patent: Mar. 20, 2018

(54) LIGHT REFLECTION FILM AND METHOD OF MANUFACTURING THE SAME

(71) Applicant: ScienBiziP Consulting (Shenzhen) Co., Ltd., Shenzhen (CN)

(72) Inventors: Feng-Yuen Dai, New Taipei (TW); Chau-Jin Hu, New Taipei (TW); Kun-Chan Wu, New Taipei (TW); Jia-Ming Wang, New Taipei (TW)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 900 days.

(21) Appl. No.: 14/219,020

(22) Filed: Mar. 19, 2014

(65) Prior Publication Data

US 2015/0177421 A1 Jun. 25, 2015

(51) Int. Cl.
*B29D 11/00* (2006.01)
*G02B 5/02* (2006.01)
*G02B 5/08* (2006.01)
*B29K 105/00* (2006.01)
*B29K 509/00* (2006.01)

(52) U.S. Cl.
CPC ...... *B29D 11/00788* (2013.01); *G02B 5/0284* (2013.01); *G02B 5/0808* (2013.01); *B29K 2105/0032* (2013.01); *B29K 2509/00* (2013.01)

(58) Field of Classification Search
CPC ................ G02B 5/0284; G02B 5/0808; B29D 11/00788
See application file for complete search history.

(56) References Cited

U.S. PATENT DOCUMENTS

2010/0227084 A1* 9/2010 Kato ...................... C09K 19/32
428/1.1

FOREIGN PATENT DOCUMENTS

| CN | 1649973 A | | 8/2005 |
| JP | 5-50446 | * | 3/1993 |
| JP | 2011-91211 | * | 5/2011 |
| TW | 200827419 A | | 7/2008 |

* cited by examiner

*Primary Examiner* — Mathieu Vargot
(74) *Attorney, Agent, or Firm* — ScienBiziP, P.C.

(57) ABSTRACT

A method of manufacturing a light refection film includes: preparing a precursor, the precursor includes white pigments and liquid UV (ultraviolet) curing material. The white pigments are evenly dispersed in the UV curing material, and a weight ratio of the white pigments and the UV curing material ranges from 20:80 to 38:62. Then the following step is providing a first base, and arranging a blocking part on the first base to limit a receiving area of the precursor. The precursor is thereafter dropped into the receiving area of the precursor. A second base is then brought to press the precursor, the precursor is cured by exposure UV to form the light reflection film, finally the first base, the second base, and the blocking part are removed to obtain the light reflection film. The present disclosure also provides a light reflection film obtained by the method.

14 Claims, 6 Drawing Sheets

LIGHT REFLECTION FILM AND METHOD OF MANUFACTURING THE SAME

BACKGROUND

1. Technical Field

The disclosure relates to a light reflection film, and also relates to a method of manufacturing the light reflection film.

2. Discussion of Related Art

Light reflection film is widely used in the field of light source and back light module. Generally, there are two ways to enhance a reflectivity of the light reflection film. In the first way, a special structure or an additional film may be formed on the light reflection film, which causes more costs. In the second way, the light reflection film is formed by plastic with white pigments mixed therein. The mixing of plastic and white pigments is treated by hot pressing and mould process and film-drawing process to form the light reflection film with a desired thickness. However, such method is complicated and time consuming. In addition, the lower content of the white pigments is benefit for the even distribution of the white pigments in the plastic, but is negative for the enhancement of the reflectivity of the light reflection film. For increasing a total content of the white pigments, the thickness of the light reflection film should be increased, which results in a high cost of raw materials and in contrary to the tendency of thinness.

What is needed, therefore, is a light reflection film and a method of manufacturing the light reflection film, which can overcome the limitations described above.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the present light reflection film and a method of manufacturing the light reflection film. Moreover, in the drawings, like reference numerals designate corresponding parts throughout the several views.

DETAILED DESCRIPTION OF EMBODIMENTS

Figure 1:
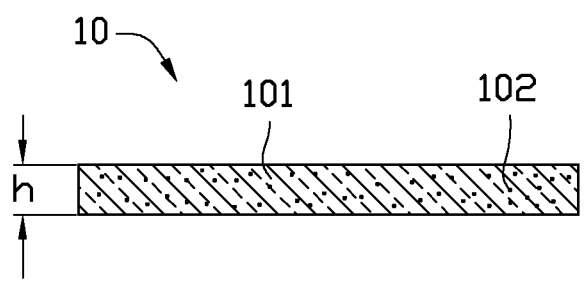
FIG. 1 is a cross-section view of a light reflection film in accordance with an exemplary embodiment of the present disclosure.

Referring to FIG. 1, a light reflection film 10 comprises UV (ultraviolet) curing material 101 and white pigments 102 contained in the UV curing material 101. A thickness h of the light reflection film 10 is less than 0.2 mm, or is equal to 0.2 mm.

The white pigments 102 are evenly dispersed in the UV curing material 101. A weight ratio of the white pigments 102 and the UV curing material 101 ranges from 20:80 to 38:62.

The UV curing material 101 is originally liquid without curing, and maintains solid after the UV curing material 101 absorbing enough ultraviolet. As shown in FIG. 1, the UV curing material 101 is solid.

The UV curing material 101 includes a photoinitiator and a curable resin. After the UV curing material 101 absorbs ultraviolet, free radicals are generated from the photoinitiator, and a cross-linking reaction or a copolymerization is reacted between the free radicals and the curable resin, which results in the change of the UV curing material 101 from liquid to solid.

The white pigments 101 are selected from a group consisting of ZnO (zinc oxide), $ZnWO_4$ (zinc tungstate), $SiO_2$ (silicon oxide), $TiO_2$ (titanium dioxide), $CaCO_3$ (calcium carbonate), $CaSO_4$ (calcium sulfate), $BaSO_4$ (barium sulfate) and $Al_2O_3$ (aluminium oxide). An average particle diameter of the white pigments 102 ranges from about 0.1 μm to about 0.4 μm.

In a preferred embodiment, the white pigments 102 are made of $TiO_2$. The average particle diameter of the white pigments 102 is about 0.3 μm, and the weight ratio of the white pigments 102 and the UV curing material 101 is 35:65.

In the present disclosure, a reflectivity of the light reflection film 10 is more than 98%, and the light reflection film 10 is as thin as no more than 0.2 mm. The light reflection film 10 is in conformity of a high reflectivity, a low thickness and a large content of the white pigments 102.

The present disclosure also provides a method of manufacturing the light reflection film 10, and the method includes the following steps.

Figure 2:
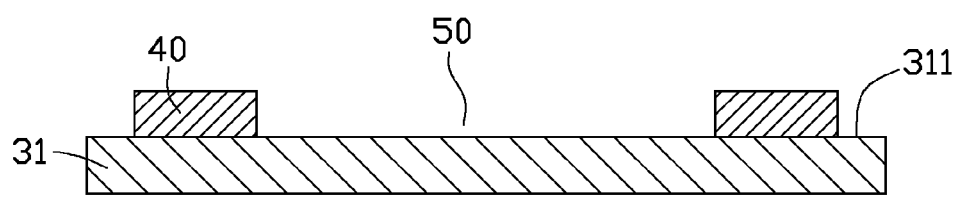
FIG. 2 is a cross-section view of a first step of a method of manufacturing the light reflection film.

Step 1 is, referring to FIG. 2, providing a precursor 10a (FIG. 3) and providing a first base 31, and arranging a blocking part 40 on a surface 311 of the first base 31 to construct a receiving area 50 for receiving the precursor 10a therein. The blocking part 40 is sticky, and arranged on the surface 311 of the first base 31. The precursor 10a comprises UV curing material 101 and white pigments 102 mixed in the UV curing material 101. The UV curing material 101 is liquid in the precursor 10a. After the UV curing material 101 absorbs ultraviolet, the UV curing material 101 turns into solid and transparent. The white pigments 102 are evenly dispersed in the UV curing material 101.

In the process of mixing the white pigments 102 into the UV curing material 101, ultrasonic wave or stirring can be used. A weight ratio of the white pigments 102 and the UV curing material 101 ranges from 20:80 to 38:62. The white pigments 102 can be selected from a group consisting of ZnO, $ZnWO_4$, $SiO_2$, $TiO_2$, $CaCO_3$, $CaSO_4$, $BaSO_4$ and $Al_2O_3$. An average particle diameter of the white pigments 102 ranges from about 0.1 μm to about 0.4 μm. Some detailed embodiments of the precursor 10a are provided hereafter.

A first exemplary embodiment:

The weight ratio of the white pigments 102 and the UV curing material 101 is 20:80. The white pigments 102 are made of ZnO. The average particle diameter of the white pigments 102 is about 0.1 μm.

A second exemplary embodiment:

The weight ratio of the white pigments 102 and the UV curing material 101 is 28:72. The white pigments 102 are made of a mixture consisting of ZnO, $ZnWO_4$ and $SiO_2$. A weight ratio of ZnO, $ZnWO_4$ and $SiO_2$ is 7:3:18. The average particle diameter of the white pigments 102 is about 0.2 μm.

Before mixing the white pigments 102 and the UV curing material 101, $SiO_2$ can be slivered or aluminized in surface treatment.

A third exemplary embodiment:

The weight ratio of the white pigments 102 and the UV curing material 101 is 30:70. The white pigments 102 are made of a mixture consisting of $CaSO_4$ and $CaCO_3$. A weight ratio of $CaSO_4$ and $CaCO_3$ is 15:15. The average particle diameter of the white pigments 102 is about 0.4 μm.

A fourth exemplary embodiment:

The weight ratio of the white pigments 102 and the UV curing material 101 is 35:65. The white pigments 102 are made of $TiO_2$. The average particle diameter of the white pigments 102 is about 0.3 μm.

Preferably, the white pigments 102 consist of spherical $TiO_2$ particles.

A fifth exemplary embodiment:

The weight ratio of the white pigments 102 and the UV curing material 101 is 35:65. The white pigments 102 are made of a mixture consisting of $TiO_2$ and $Al_2O_3$. A weight ratio of $TiO_2$ and $Al_2O_3$ is 30:5. The average particle diameter of the white pigments 102 is about 0.3 μm.

A hardness of $Al_2O_3$ is more than a hardness of $TiO_2$. In this embodiment, before mixing the white pigments 102 and the UV curing material 101, $TiO_2$ can be polished by $Al_2O_3$ by a vibration polishing treatment to increase a surface evenness and smooth of $TiO_2$, which is benefit for increasing a reflectivity of $TiO_2$.

A sixth exemplary embodiment:

The weight ratio of the white pigments 102 and the UV curing material 101 is 38:62. The white pigments 102 are made of a mixture consisting of $BaSO_4$ and $Al_2O_3$. A weight ratio of $BaSO_4$ and $Al_2O_3$ is 15:23. The average particle diameter of the white pigments 102 is about 0.2 μm.

It is understood that the precursor 10a is not limited to the above embodiments. For example, the white pigments 102 can be made of organic material.

Figure 3:
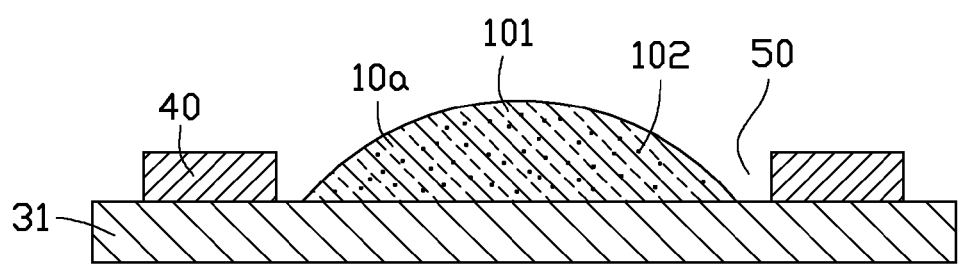
FIG. 3 is a cross-section view of a second step of a method of manufacturing the light reflection film.

Step 2 is, referring to FIG. 3, dropping the precursor 10a into the receiving area 50. Since the UV curing material 101 includes resin, the precursor 10a comprising the UV curing material 101 and white pigments 102 has a certain viscosity and presents substantially a dome-shaped cross section after it has been dropped in the receiving area 50.

Figure 4:
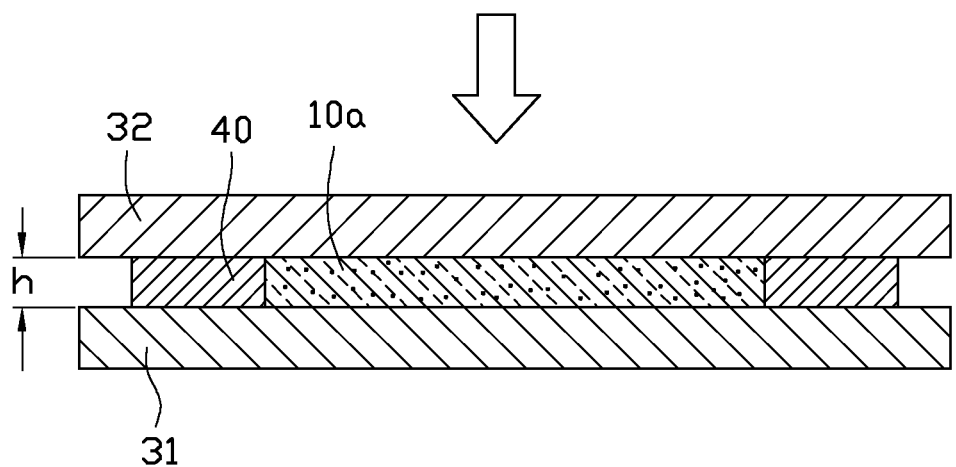
FIG. 4 is a cross-section view of a third step of a method of manufacturing the light reflection film.

Step 3 is, referring to FIG. 4, providing a second base 32 to press the precursor 10a located on the first base 31 and to flatten the precursor 10a. A distance between the first base 31 and the second base 32 depends on a pressure pressed on the first base 31 and the second base 32.

It is understood that the receiving area 50 is not fully closed (not shown). When pressing the second base 32 on the first base 31, a redundant part of the precursor 10a can flow out of the receiving area 50.

Figure 5:
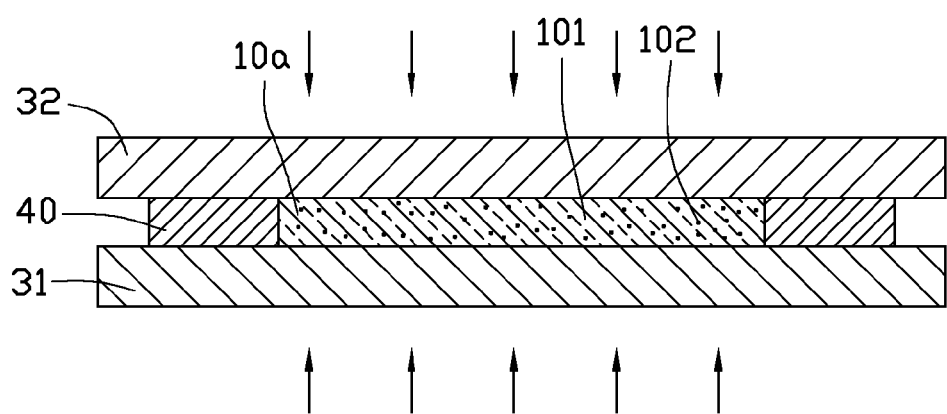
FIG. 5 is a cross-section view of a fourth step of a method of manufacturing the light reflection film.

Step 4 is, referring to FIG. 5, curing the precursor 10a to form the light reflection film 10. It is understood that a thickness h of the light reflection film 10 is the distance between the first base 31 and the second base 32. In this embodiment, the thickness h of the light reflection film 10 is less than or equal to 0.2 mm.

The UV curing material 101 includes a photoinitiator and a curable resin. After the UV curing material 101 absorbs ultraviolet, free radicals are generated by the photoinitiator, and a cross-linking reaction or a copylymerization is reacted between the free radicals and the curable resin, resulting in the change of the UV curing material 101 from liquid to solid.

It is understood that the first base 31 and the second base 32 are made of transparent material, and ultraviolet can pass through the first base 31 and the second base 32. Further, in order to increase a curing efficiency, the first base 31 and the second base 32 are made of transparent glass, and the precursor 10a absorbs ultraviolet passing through the first base 31 and the second base 32 at the same time.

Figure 6:
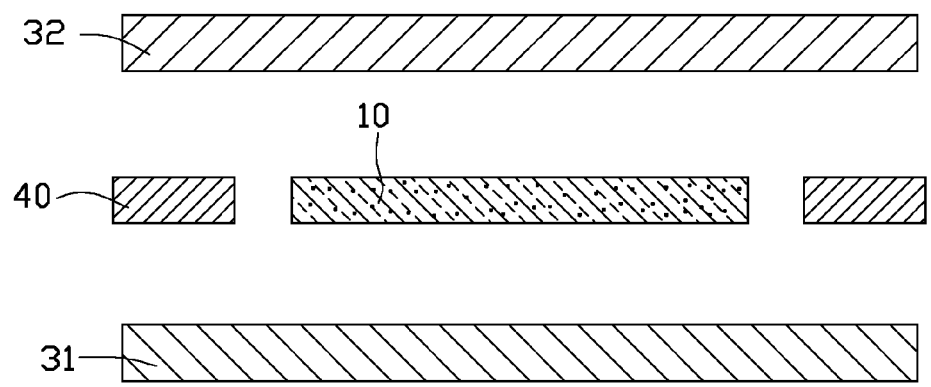
FIG. 6 is a cross-section view of a fifth step of a method of manufacturing the light reflection film.

Step 5 is, referring to FIGS. 1 and 6, removing the first base 31, the second base 32, and the blocking part 40. It is understood that, in order to manufacture the light reflection film 10 with a proper size or a proper shape, a cutting step after the step 5, may be needed.

Further, in order to easily remove the blocking part 40 from the first base 31 or the second base 32 in step 5, the blocking part 40 is preferably made of UV curing material. After absorbing ultraviolet, the blocking part 40 changes into solid and moves freely relative to the first and second bases 31, 32 and the light reflection film 10.

In the present disclosure, a reflectivity of the light reflection film 10 is more than 98%, and a thickness of the light reflection film 10 is less than or equal to 0.2 mm. The light reflection film 10 has a high content of the white pigments 102, and the white pigments 102 are evenly dispersed in the light reflection film 10. The light reflection film 10 is in conformity of a high reflectivity, a low thickness and a large content of the white pigments 102. The method of manufacturing the light reflection film 10 avoids hot pressing and mould process and film-drawing process, thereby lowering the manufacturing cost.

What is claimed is:

1. A method of manufacturing a light reflection film, comprising:
    preparing a precursor and a first base, and arranging a blocking part on the first base to define a receiving area on the first base, wherein the precursor comprises white pigments and liquid UV curing material, the white pigments are evenly dispersed in the UV curing material, and a weight ratio of the white pigments and the UV curing material ranges from 20:80 to 38:62;
    dropping the precursor into the receiving area;
    providing a second base to press and flatten the precursor;
    curing the precursor to form the light reflection film; and
    removing the first base, the second base, and the blocking part to obtain the light reflection film;
    wherein the first base and the second base are made of transparent materials.

2. The method of manufacturing the light reflection film of claim 1, wherein a thickness of the light reflection film is no more than 0.2 mm.

3. The method of manufacturing the light reflection film of claim 1, wherein an average particle diameter of the white pigments ranges from about 0.1 μm to about 0.4 μm.

4. The method of manufacturing the light reflection film of claim 1, wherein before preparing the precursor, the white pigments are treated by a process of surface treatment to increase a surface evenness and smooth thereof to thereby increase a reflectivity thereof.

5. The method of manufacturing the light reflection film of claim 4, wherein the white pigments are selected from the group consisting of ZnO, $ZnWO_4$, $SiO_2$, $TiO_2$, $CaCO_3$, $CaSO_4$, $BaSO_4$, and $Al_2O_3$.

6. The method of manufacturing the light reflection film of claim 5, wherein the white pigments are made of ZnO, and an average particle diameter of the white pigments is about 0.1 μm.

7. The method of manufacturing the light reflection film of claim 5, wherein the white pigments are made of a mixture consisting of ZnO, $ZnWO_4$ and $SiO_2$, a weight ratio of ZnO, $ZnWO_4$ and $SiO_2$ is 7:3:18, and an average particle diameter of the white pigments is about 0.2 μm.

8. The method of manufacturing the light reflection film of claim 5, wherein the white pigments are made of a mixture consisting of $CaSO_4$ and $CaCO_3$, a weight ratio of $CaSO_4$ and $CaCO_3$ is 15:15, and an average particle diameter of the white pigments is about 0.4 µm.

9. The method of manufacturing the light reflection film of claim 5, wherein the white pigments are made of $TiO_2$, an average particle diameter of the white pigments is about 0.3 µm.

10. The method of manufacturing the light reflection film of claim 9, wherein the white pigments consist of spherical $TiO_2$ particles.

11. The method of manufacturing the light reflection film of claim 5, wherein the white pigments are made of a mixture consisting of $TiO_2$ and $Al_2O_3$, a weight ratio of $TiO_2$ and $Al_2O_3$ is 30:5, and an average particle diameter of the white pigments is about 0.3 µm.

12. The method of manufacturing the light reflection film of claim 5, wherein the white pigments are made of a mixture consisting of $BaSO_4$ and $Al_2O_3$, a weight ratio of $BaSO_4$ and $Al_2O_3$ is 15:23, and an average particle diameter of the white pigments is about 0.2 µm.

13. The method of manufacturing the light reflection film of claim 1, wherein the first base and the second base are made of transparent glass.

14. The method of manufacturing the light reflection film of claim 1, wherein the receiving area is not fully closed to release a redundant part of the precursor.

\* \* \* \* \*